United States Patent
Xu et al.

(10) Patent No.: US 12,442,441 B2
(45) Date of Patent: Oct. 14, 2025

(54) STIRRING COMPONENT FOR HARMONIC TRANSMISSION SYSTEM AND ASSOCIATED HARMONIC TRANSMISSION SYSTEM

(71) Applicant: ABB SCHWEIZ AG, Baden (CH)

(72) Inventors: Pushuang Xu, Shanghai (CN); Qianhu Zhang, Shaanxi (CN); Xinguo Fu, Shanghai (CN); Mao Li, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/732,976

(22) Filed: Jun. 4, 2024

(65) Prior Publication Data

US 2024/0360894 A1  Oct. 31, 2024

Related U.S. Application Data

(63) Continuation of application No. PCT/CN2021/135744, filed on Dec. 6, 2021.

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC ... F16H 49/001; F16H 2049/003; F16H 57/04
See application file for complete search history.

(56) References Cited

U.S. PATENT DOCUMENTS

| | | | | |
|---|---|---|---|---|
| 3,482,770 A | * | 12/1969 | Nelson | B04B 1/2016 494/83 |
| 9,732,842 B2 | * | 8/2017 | Huang | F16H 57/0427 |
| 2005/0124452 A1 | | 6/2005 | Stoianovici et al. | |
| 2017/0370457 A1 | * | 12/2017 | Kobayashi | F16H 1/32 |

FOREIGN PATENT DOCUMENTS

| | | | | |
|---|---|---|---|---|
| CN | 106151472 A | | 11/2016 | |
| CN | 106481763 A | | 3/2017 | |
| CN | 212899615 U | | 4/2021 | |
| JP | 2013092217 A | * | 5/2013 | |
| WO | WO-2021039931 A1 | * | 3/2021 | ......... F16H 57/0427 |

* cited by examiner

*Primary Examiner* — William C Joyce
(74) *Attorney, Agent, or Firm* — GREENBERG TRAURIG, LLP

(57) ABSTRACT

A stirring component includes a body arranged in an internal chamber at a side of a circular spline away from a flex spline of the harmonic transmission system. The body includes a coupling hole through which the body is coupled to and rotated with an input shaft of the harmonic transmission system, and at least one stirring recess arranged on a side of the body adjacent to the circular spline and has a varying depth in an axial direction to stir and push lubricant medium within the internal chamber towards the flex spline during rotation of the body. With the stirring component arranged within the internal chamber, the plate-shaped body can block the lubricant medium from moving further. Furthermore, the stirring component can stir and push the lubricant medium away from the body towards the flex spline.

19 Claims, 5 Drawing Sheets

STIRRING COMPONENT FOR HARMONIC TRANSMISSION SYSTEM AND ASSOCIATED HARMONIC TRANSMISSION SYSTEM

CROSS-REFERENCE TO RELATED APPLICATIONS

This application claims priority to and is a continuation application of international patent application number PCT/CN2021/135744, filed on Dec. 6, 2021, which is herein incorporated by reference in its entirety.

FIELD

Embodiments of the present disclosure generally relate to a harmonic transmission system, and more specifically, to a stirring component for a harmonic transmission system.

BACKGROUND

A harmonic transmission system (also known as strain wave transmission) is a new type of transmission mode, which is different from traditional gear transmission. It mainly transfers power through the deformation of flexible gears, with small volume, high precision, large transmission ratio and other excellent performance features. Therefore, it is widely used in the field of high-precision machinery, such as industrial robots, aerospace equipment, etc.

Like many other traditional gear transmission systems, components in a harmonic transmission system need to be lubricated to improve its accuracy and efficiency. Among the essential issues facing designers of harmonic gears, the provision for correct lubrication should be of paramount importance. Components in the harmonic transmission system can be lubricated with plastic grease or with oil. These two lubrication methods are used typically in applications of manipulators and robots. The compactness of the structure characterizing the harmonic transmission system is an argument in favor of the use of plastic grease. Limited space inside the transmission and internally meshed splines allows introduction of the lubricant directly into the tooth spaces of transmission gears. Tooth space bottom functions as lubrication pockets and the smallness of space creates favorable conditions for achieving proper conditions of lubrication. Moreover, grease is applied inside the flex spline body and onto non-working surfaces of the flex spline sleeve.

SUMMARY

Embodiments of the present disclosure provide a stirring component for a harmonic transmission system as well as a harmonic transmission system.

In a first aspect, a stirring component for a harmonic transmission system is provided. The stirring component comprises a body arranged in an internal chamber at a side of a circular spline away from a flex spline of the harmonic transmission system, the body comprising a coupling hole through which the body is coupled to and rotated with an input shaft of the harmonic transmission system; and at least one stirring recess arranged on a side of the body adjacent to the circular spline and has a varying depth in an axial direction to stir and push lubricant medium within the internal chamber towards the flex spline during rotation of the body.

With the stirring component arranged within the internal chamber, on the one hand, the plate-shaped body can efficiently block the lubricant medium from moving further. Furthermore, the volume of the chamber adjacent to the circular spline is reduced due to the occupation of the body. On the other hand, the stirring component can stir and push the lubricant medium away from the body towards the flex spline. So the lubricant medium can be re-distributed in the internal chamber to uniformly lubricate components such as teeth within the internal chamber. In this way, the accuracy, efficiency and even the service life of the harmonic transmission system can be significantly improved.

In some embodiments, the at least one stirring recess comprises a plurality of stirring recesses that are equally spaced and each have a fan shape. In this way, the lubricant medium can be evenly stirred within the internal chamber.

In some embodiments, the depth of the at least one stirring recess gradually decreases from a middle to both ends of the stirring recess in a circumferential direction. In this way, the lubricant medium can be efficiently pushed and stirred by the stirring recess to obtain a uniform redistribution thereof.

In some embodiments, a bottom surface of the at least one stirring recess has a curved cross-section in the circumferential direction. This arrangement can prevent the lubricant medium from being stuck on the bottom surface of the stirring recess, to thereby obtain a uniform redistribution of the lubricant medium.

In some embodiments, an extension angle of the at least one stirring recess in a circumferential direction is between 45°-180°. This may ensure the efficient stirring of the stirring recess to the lubricant medium.

In some embodiments, a number of the at least one stirring recess is 2-4.

In some embodiments, the stirring component further comprises a plurality of stirring bodies protruding from an end surface of the body adjacent to the circular spline into a ring groove of the circular spline. The stirring bodies can further stir the lubricant medium to facilitate the uniform redistribution of the lubricant medium.

In some embodiments, the plurality of stirring bodies comprise at least two sets of stirring bodies having different radial distances from a center axis of the input shaft. This arrangement can ensure the full covering of the ring groove of the circular spline during the stirring of the stirring bodies.

In some embodiments, each of the plurality of stirring bodies is cylindrical. In this way, on the one hand, the stirring bodies can be manufactured more easily. On the other hand, the cylindrical stirring body can ensure the uniformly stirring effect.

In some embodiments, the body is coupled to the input shaft by fasteners, tight fitting or key fitting. This arrangement ensures the easy and stable coupling of the body to the input shaft.

In a second aspect, a harmonic transmission system is provided. The harmonic transmission system comprises a circular spline comprising internal teeth; a flex spline coupled to an output shaft and comprising external teeth adapted to partially engaged with the internal teeth, the flex spline partially enclosing an internal chamber; a wave generator adapted to be driven by an input shaft to rotate and having an oval shape to promote engagement of the internal teeth and the external teeth during rotation; and a stirring component as mentioned in the first aspect and arranged in the chamber and coupled to the input shaft at a side of the circular spline away from the flex spline.

In a third aspect, a robot is provided. The robot comprises a plurality of robot arm links; and at least one harmonic transmission system as mentioned in the second aspect and arranged between the plurality of robot arm links.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

As mentioned above, a harmonic transmission system (also known as strain wave transmission system) is a type of mechanical gear system that uses a flex spline with external teeth, which is deformed by a rotating elliptical plug to engage with the internal gear teeth of a circular spline. Due to some advantages such as no backlash, compactness and light weight, high gear ratios, reconfigurable ratios within a standard housing, etc., the harmonic transmission system is widely used in the field of high-precision machinery, such as industrial robots, aerospace equipment, etc.

Figure 1:
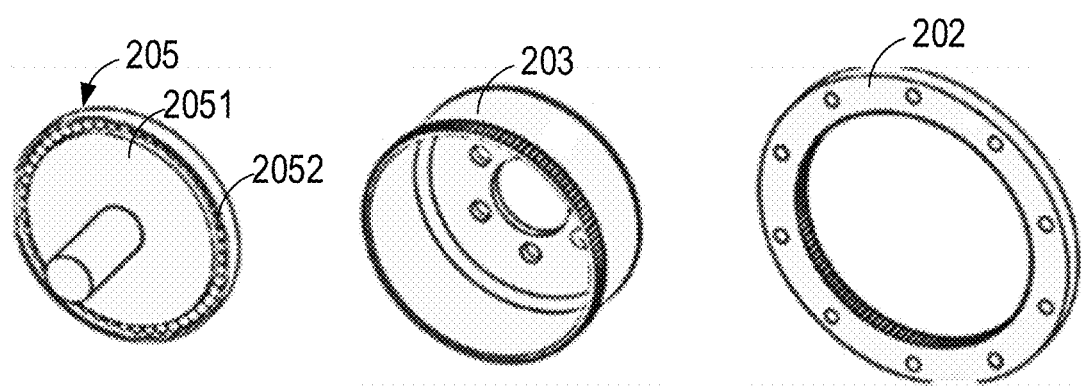
FIG. 1 shows an exploded view of a conventional harmonic transmission system.

The harmonic transmission system 200 such as a harmonic reducer has three basic components: a wave generator 205, a flex spline 203, and a circular spline 202, as shown in FIG. 1. More complex versions have a fourth component normally used to shorten the overall length or to increase the gear reduction within a smaller diameter, but still follow the same basic principles.

The wave generator 205 comprises two separate parts: an elliptical disk, also known as an elliptical plug 2051, and an outer ball bearing 2052. The elliptical plug 2051 is inserted into the bearing 2052, forcing the bearing 2052 to conform to the elliptical shape but still allowing rotation of the elliptical plug 2051 within the outer ball bearing 2052.

The flex spline 203 is shaped like a shallow cup. The sides of the flex spline 203 are typically thin, but the bottom is relatively rigid. This results in significant flexibility of the walls at the open end due to the thin wall, and in the closed side being rigid enough to be tightly secured (to an output shaft, for example). Teeth are positioned radially around the outside of the flex spline 203. The flex spline 203 fits tightly over the wave generator 205, so that when the elliptical plug 2051 is rotated, the flex spline 203 deforms to the shape of a rotating ellipse and does not slip over the outer elliptical ring of the ball bearing 2052. The ball bearing 2052 lets the flex spline 203 rotate independently to the wave generator's shaft.

The circular spline 202 is a rigid circular ring with internal teeth on its inside. The flex spline 203 and wave generator 205 are placed inside the circular spline 202, meshing the teeth of the flex spline 203 and the circular spline 202. Because the flex spline 203 is deformed into an elliptical shape, its external teeth only actually mesh with the internal teeth of the circular spline 202 in two regions on opposite sides of the flex spline 203 (located on the major axis of the ellipse).

Assume that the wave generator 205 is driven to rotate by a motor. As the elliptical plug 2051 rotates, the flex spline's external teeth which are meshed with the internal teeth of the circular spline 202 slowly change position. The major axis of the flex spline's ellipse rotates with wave generator 205, so the points where the teeth mesh revolve around the center point at the same rate as the wave generator's shaft. The key to the design of the harmonic reducer is that there are fewer teeth on the flex spline 203 than there are on the circular spline 202. This means that for every full rotation of the wave generator 205, the flex spline 203 would be required to rotate a slight amount backward relative to the circular spline 202. Thus the rotation action of the wave generator 205 results in a much slower rotation of the flex spline 203 in the opposite direction.

As mentioned above, like many other traditional gear transmission systems, components in a harmonic gear transmission system need to be lubricated to improve its accuracy and efficiency. When designing or manufacturing a harmonic transmission system, it is of great importance to effectively lubricate its components. Due to the compact structure of the harmonic transmission system, it tends to use less fluid lubricant grease for lubrication of the components.

The lubricant medium such as the lubricant grease is typically received in an internal chamber 201 formed by outer cases of the harmonic transmission system 200. The internal teeth of the circular spline 202, the external teeth of the flex spline 203 and the wave generator 205 are arranged within the internal chamber 201 or form a part thereof. Limited space inside the internal chamber 201 and internally meshed splines allows introduction of the lubricant directly into the tooth spaces of transmission gears. Tooth space bottom functions as lubrication pockets and the smallness of space creates favorable conditions for achieving proper conditions of lubrication. Moreover, the lubricant grease is applied inside the flex spline body and onto non-working surfaces of the flex spline sleeve.

Due to the eccentric rotation of the wave generator 205, it tends to push the lubricant grease away to other places within the internal chamber 201. In addition, due to the poor fluidity of the lubricant grease, it is typically difficult for the pushed away grease to return to the locations where the flex spline 203 and the wave generator 205 are engaged, resulting in poor lubrication in these locations, and ultimately leading to errors, failures and overruns in the harmonic transmission system.

In the traditional solutions, there are some arrangements to effectively lubricate the components in the harmonic transmission system, but due to factors such as the structure and placement of these arrangements in the harmonic transmissions system, these means cannot achieve the desired effect, especially in the case of long-term operation of harmonic transmissions system.

For example, U.S. Pat. No. 9,732,836B2 provides a harmonic drive featuring helix-facilitated lubrication. In the harmonic drive, an agitating member is located in a lubricant-holding space between the wave generator and the flex spline, and has a rotatory part and blade parts formed about a rotatory part. However, due to the complex structure of the agitating member, it is difficult to implement in engineering and the cost is high. In addition, since the flow law of grease was not considered when designing the arrangement position, its lubricating effect is limited.

In order to solve or at least partly solve the above and other potential problems, embodiments of the present disclosure provide a stirring component 100 for a harmonic transmission system 200 and an associated harmonic transmission system 200. Now some example embodiments will be described with reference to FIGS. 2-5.

Figure 2:
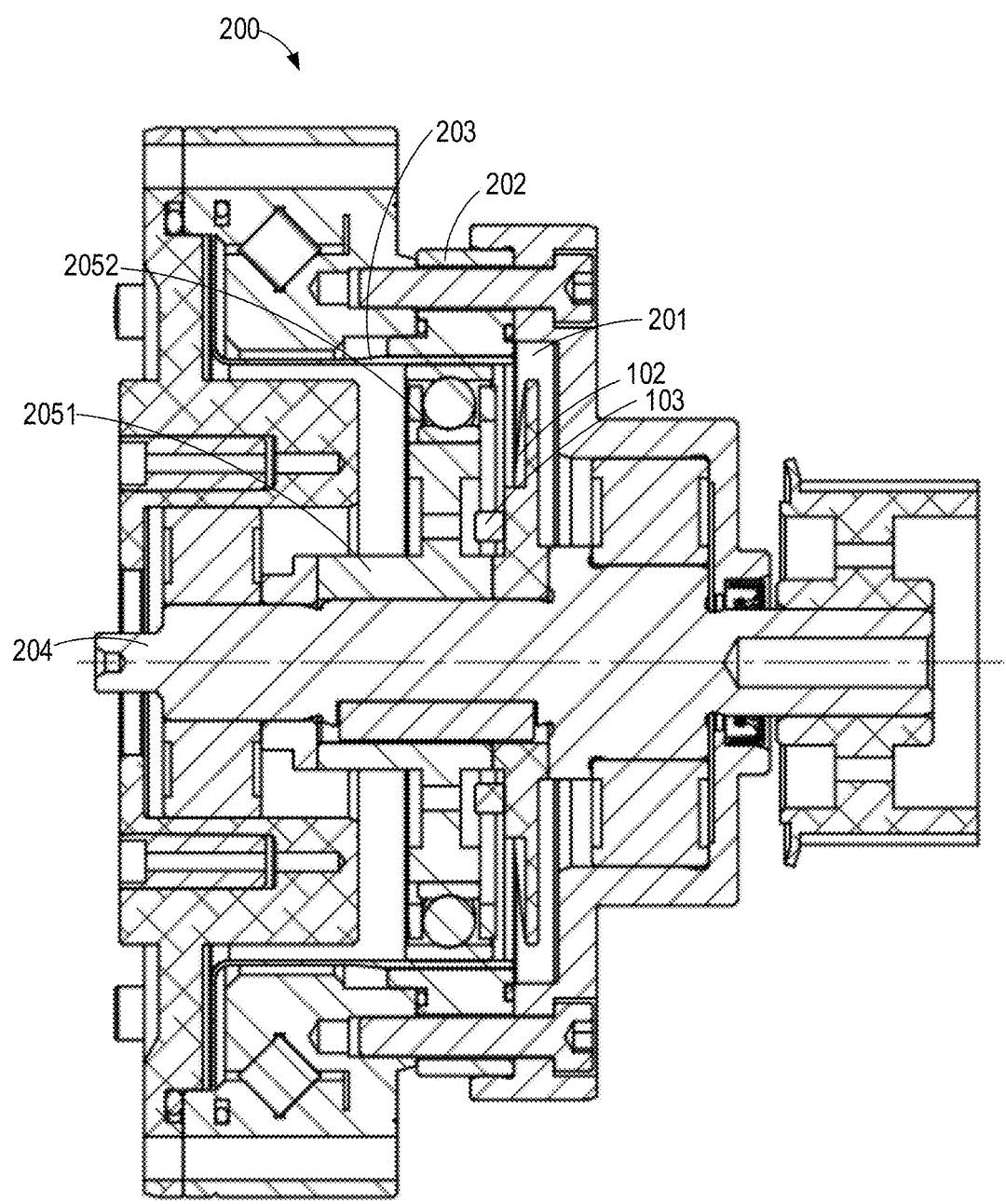
FIG. 2 shows a sectional side view of a harmonic transmission system according to embodiments of the present disclosure.

FIG. 1 shows a sectional side view of the harmonic transmission system 200, and FIG. 2 shows an exploded view of the harmonic transmission system 200 according to embodiments of the present disclosure. As shown in FIGS. 1 and 2, generally, the harmonic transmission system 200 according to embodiments of the present disclosure comprises a circular spline 202, a flex spline 203, a wave generator 205 and a stirring component 100. The circular spline 202, the flex spline 203, the wave generator 205 typically have the similar structures and functions as mentioned above. That is, the circular spline 202 is a rigid circular ring with teeth, i.e., internal teeth on its inside. The flex spline 203 has significant flexibility of the walls at the open end, and in the closed side being rigid enough to be tightly secured to an output shaft, for example. Teeth, i.e., external teeth are positioned radially around the outside of the flex spline 203 which are adapted to be engaged with the internal teeth.

The wave generator 205 comprises two separate parts: an elliptical disk also known as an elliptical plug 2051 and an outer ball bearing 2052. The elliptical plug 2051 is inserted into the bearing and coupled to an input shaft 204. A motor may be coupled to the input shaft 204 to thereby drive the input shaft 204 and the elliptical plug 2051 to rotate. The rotation of the elliptical plug 2051 forces the flex spline 203 to be deformed to the shape of a rotating ellipse, causing the external teeth only actually mesh with the internal teeth of the circular spline 202 in two regions on opposite sides of the flex spline 203. For every full rotation of the wave generator 205, the flex spline 203 would be required to rotate a slight amount backward relative to the circular spline 202. Thus the rotation action of the wave generator 205 results in a much slower rotation of the flex spline 203 in the opposite direction, leading to high gear ratios.

In comparison to the conventional harmonic transmission system 200, the stirring component 100 is arranged at a side of the circular spline 202 away from the flex spline 203. This arrangement position is proposed by the inventors in full consideration of the flow characteristics of the grease in the internal chamber 201. As a result, the lubricant medium accumulated at the side of the circular spline 202 can be stirred and pushed towards the flex spline 203 and the wave generator 205 to thereby achieve uniform lubrication of the components of the harmonic transmission system 200.

Figure 4:
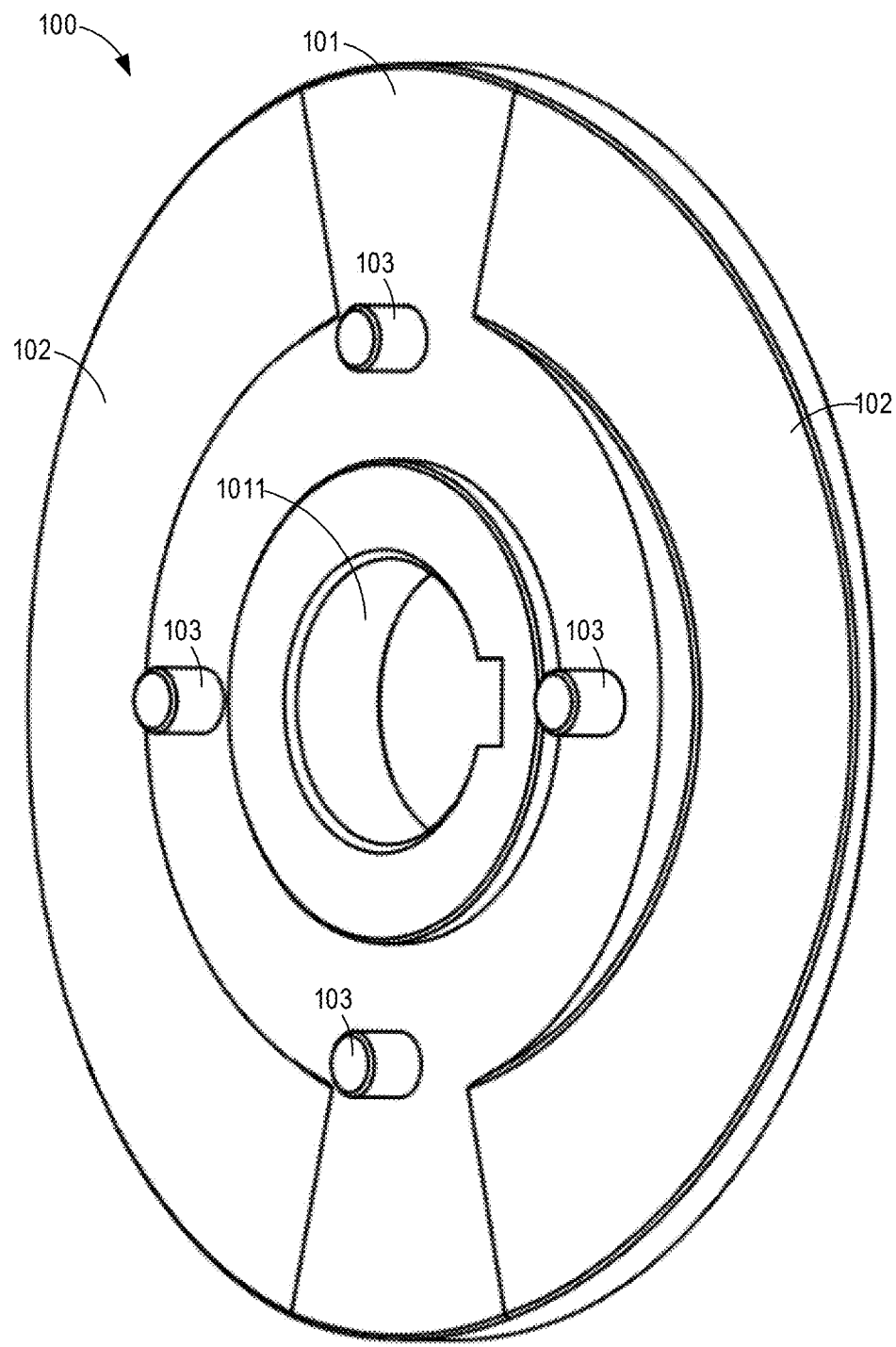
FIG. 4 shows a perspective view of a stirring component according to embodiments of the present disclosure.
Figure 5:
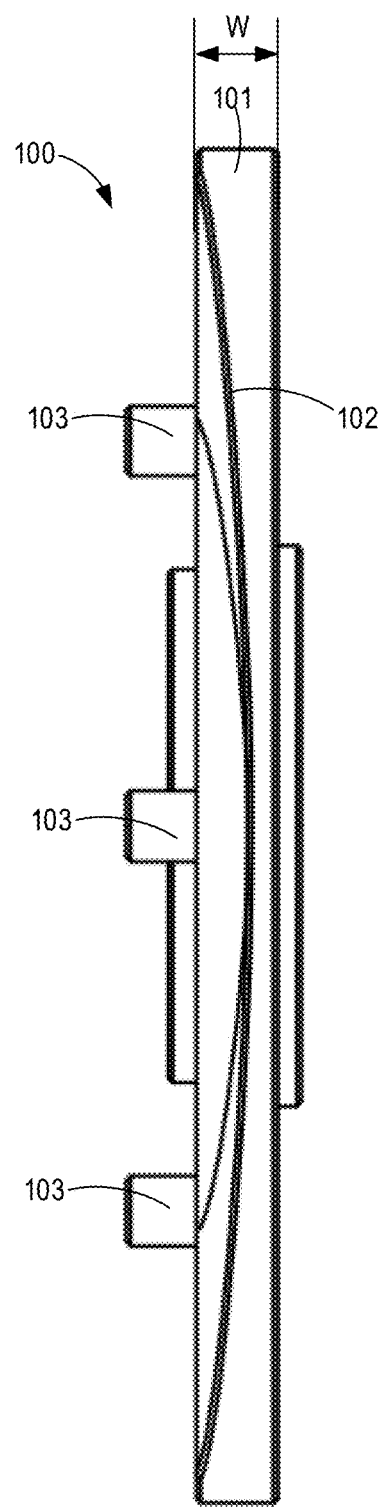
FIG. 5 shows a side view of a stirring component according to embodiments of the present disclosure.

FIGS. 4 and 5 respectively show a perspective view and a side view of the stirring component 100 according to example embodiments of the present disclosure. As shown in FIGS. 4 and 5, the stirring component 100 generally comprises a body 101 and at least one stirring recess 102. The body 101 is plate-shaped and arranged in the internal chamber 201 at a side of the circular spline 202 away from the flex spline 203. The plate-shaped body 101 can efficiently block the lubricant medium from moving further. The body 101 has a coupling hole 1011 through which the body 101 is fixedly coupled to the input shaft 204, e.g., through key fitting, etc. During the rotation of the input shaft 204 and the wave generator 205, the body 101 rotates with the input shaft 204.

It is to be understood that the above embodiments where the stirring component 100 is coupled to the input shaft 204 through key fitting are merely illustrative, without suggesting any limitation as to the scope of the present disclosure. Any other suitable fastener method is also possible. For example, in some alternative embodiments, the stir component 100 may also be coupled to the input shaft 204 by fasteners such as screws or by tight fitting. Tight fitting, also known as an interference fit, press fit or friction fit, is a form of fastening between two tight fitting mating parts that produces a joint which is held together by friction after the parts are pushed together.

In the conventional solutions, as mentioned above, during the operation of the harmonic transmission system 200, the lubricant medium within the internal chamber 201 tend to move towards the circular spline 202 with the eccentric rotation of the wave generator 205. On the contrary, with the plate-shaped body 101 according to embodiments of the present disclosure, the lubricant medium will be accumulated at a side of the stirring component 100 adjacent to the circular spline 202. The at least one stirring recess 102 is arranged at the side of the stirring component 100 adjacent to the circular spline 202 to prevent accumulation of the lubricant medium.

Figure 3:
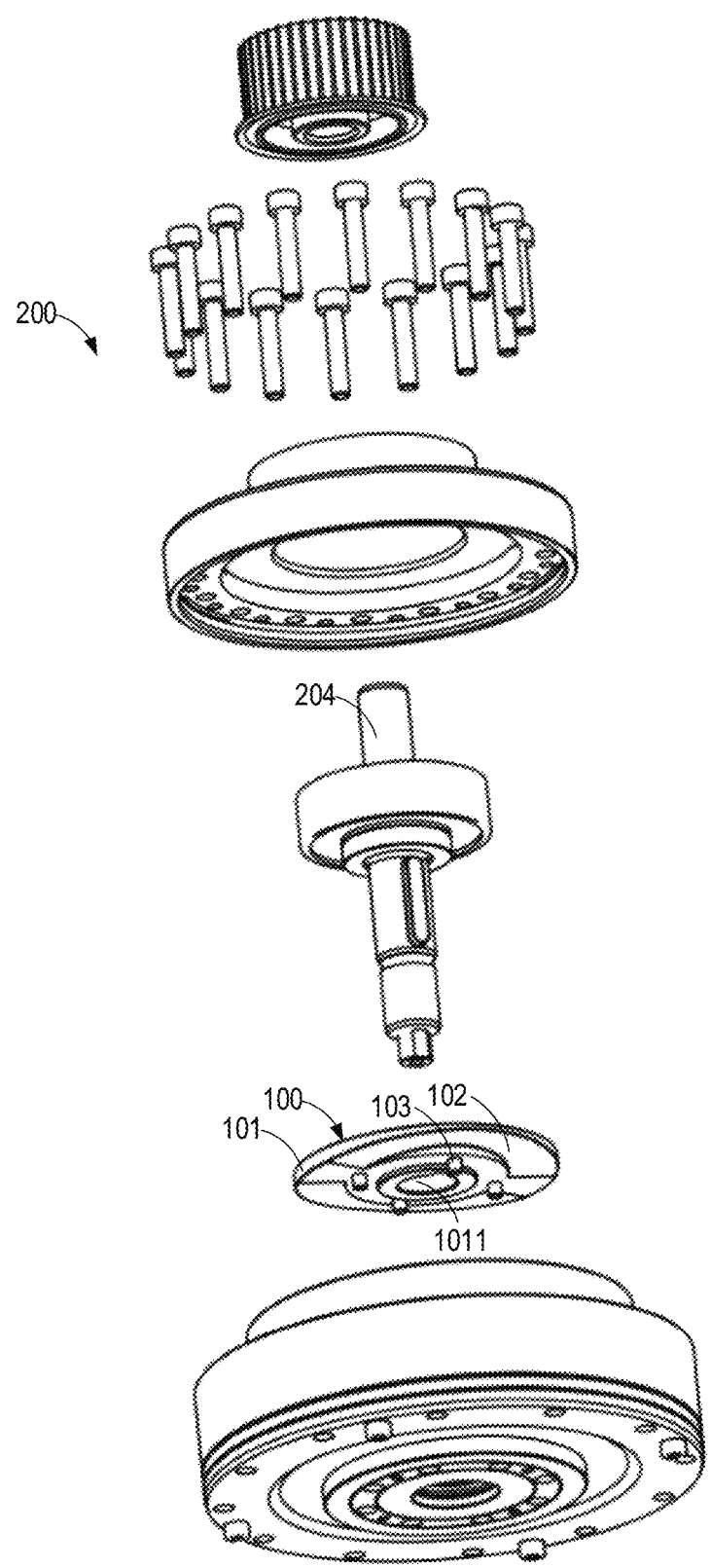
FIG. 3 shows an exploded view of a harmonic transmission system according to embodiments of the present disclosure.

FIG. 3 shows that there are two stirring recess 102 arranged on the side of the body 101 adjacent to the circular spline 202. It is to be understood that this is merely illustrative, without suggesting any limitation as to the scope of the present disclosure. Any other suitable number of the at least one stirring recess 102 is also possible. For example, in some embodiments, the number of the at least one stirring recess 102 may also be one, three or four. In the following, the concept of the present disclosure will be discussed by taking the case where there are two stirring recesses 102 as shown in FIG. 3 as an example. It is to be understood that other cases are similarly and will not be repeated respectively.

Each of the stirring recesses 102 has a varying depth in an axial direction to allow a bottom wall of the stirring recess 102 in the axial direction to push the lubricant medium away towards the flex spline 203 during the rotation thereof. In this way, with the rotation of the body 101, the lubricant accumulated at the side of the body 101 adjacent to the circular spline 202 will be stirred and pushed away from the circular spline 202 to the flex spline 203 and the wave generator 205, to thereby facilitate the uniform redistribution of the lubricant medium in the internal chamber 201.

With the stirring component 100 arranged within the internal chamber 201, on the one hand, the plate-shaped body 101 can efficiently block the lubricant medium from moving further. Furthermore, the volume of the internal chamber 201 adjacent to the circular spline 202 is reduced due to the occupation of the body 101. On the other hand, the stirring component 100 can stir and push the lubricant medium away from the body 101 towards the flex spline 203. So the lubricant medium can be re-distributed in the internal chamber 201 to uniformly lubricate components such as teeth within the internal chamber 201. In this way, the accuracy, efficiency and even the service life of the harmonic transmission system 200 can be significantly improved.

Furthermore, due to a simple structure and a simple arrangement method of the stirring component 100, it can be set on an existing harmonic transmission system, so that the existing harmonic transmission system can be effectively lubricated, thereby improving the service life, efficiency and accuracy of the existing harmonic transmission system.

In some embodiments, in the case where a plurality of stirring recesses 102 are arranged on the side of the body 101 adjacent to the circular spline 202, they are equally spaced and each substantially have a fan shape, as shown in FIG. 3. This arrangement can further facilitate the uniform redistribution of the lubricant medium in the internal chamber 201. In some embodiments, the extension angle of the fan-shaped stirring recess 102 in the circumferential direction may be between 45°-180°. For example, in some embodiments, the extension angle of the stirring recess 102 in the circumferential may be 140°.

In some embodiments, as shown in FIG. 4, the stirring recess's depth in an axial direction may gradually decrease from middle to both ends thereof in a circumferential direction. This enables the stirring component 100 to effectively stir the grease with the stirring recess regardless of whether it is rotating forward or reverse. For example, the thickness of the body 101 without the stirring recess 102 in the axial direction may be W. The depth of the stirring recess 102 in the circumferential direction may be changed from 0 at the both ends of the stirring recess 102 to 0.7×W at the middle of the stirring recess 102 in the circumferential direction. That is, the thickness of the body 101 at the stirring recess 102 in the axial direction may be ranged from W at the both ends to W−0.7×W=0.3×W at the middle of the stirring recess 102.

It is to be understood that the above depth of the stirring recess and the thickness of the body 101 in the axial direction are merely illustrative, without suggesting any limitation as to the scope of the present disclosure. Any other suitable ratio of the depth of the stirring recess 102 to thickness of body 101 is also possible. For example, in some embodiments, the ratio of the depth of the stirring recess 102 to thickness of body 101 may be ranged from 0 to 0.8 according to factors such as the fluidity of the lubricant medium and the volume of the internal chamber 201, etc.

To achieve the above mentioned varying depth of the stirring recess 102, in some embodiments, the bottom surface of the stirring recess 102 in the circumferential direction is arc-shaped. The bottom surface of the stirring recess 102 forms a part of an end surface of the body 101 adjacent to the circular spline 202. During the rotation of the body 101, the lubricant medium into the stirring recess 102 will be pushed out by the arc-shaped bottom surface and continues to move to the flex spline 203 under the action of inertial force. Furthermore, the arc-shaped bottom surface may prevent the lubricant medium from staying or getting stuck in the stirring recess 102.

To further facilitate the uniform redistribution of the lubricant medium with the stirring recess 102, the varying rate of the depth of the stirring recess 102 may gradually decrease from the inside to the outside in the radial direction. This arrangement can cause the bottom surface of the stirring recess 102 to push the lubricating medium from the inside to the outside in the radial direction, thereby further facilitating the uniform redistribution of the lubricating medium.

It is to be understood that embodiments where the bottom surface of the stirring recess 102 have an arc shape in the circumferential direction are merely illustrative, without suggesting any limitation as to the scope of the present disclosure. Any other suitable shape of the bottom surface of the stirring recess 102 is also possible. For example, in some alternative embodiments, the bottom surface of the stirring recess 102 may have triangle, trapezoid, oval, or semi-hyperboloid cross-sectional shape in the circumferential direction.

In some embodiments, the stirring recess 102 may be formed on the end of the body 101 by machining. For example, after the body 101 is manufactured, the stirring recess 102 may be formed by computerized numerical control machining. In some alternative embodiments, the body 101 with the stirring recess 102 may be directly manufactured through the mold.

In some embodiments, to facilitate the stirring effect of the stirring component 100, as shown in FIGS. 3 and 4, the stirring component 100 may further comprise a plurality of stirring bodies 103. Each stirring body 103 protrudes from the end surface of the body 101 adjacent to the circular spline 202 into a ring groove of the circular spline 202. With the rotation of the body 101, the stirring body 103 can further stir the lubricant medium to facilitate the uniform redistribution of the lubricant medium in the internal chamber 201.

In some embodiments, the plurality of stirring bodies 103 may comprise at least two sets of stirring bodies 103 having different radial distances from a center axis of input shaft 204. FIG. 4 shows there are two sets of stirring bodies 103. Each set may comprise two stirring bodies 103 arranged diametrically opposite each other. One set of the stirring bodies 103 are arranged at a radially outward position in the ring groove and other set of the stirring bodies 103 are arranged at a radially inward position in the ring groove of the circular spline 202. In this way, the lubricant medium in the ring groove of the circular spline 202 may be fully stirred and pushed away with the rotation of the stirring component 100.

In some embodiments, each stirring body 103 may be cylindrical, as shown in FIG. 4. In this way, on the one hand, the stirring bodies 103 can be manufactured more easily. On the other hand, the cylindrical stirring body 103 can ensure the uniformly stirring effect. It is to be understood that the cylindrical shape of the stirring body 103 as shown in FIG. 4 is merely illustrative, without suggesting any limitation as to the scope of the present disclosure. Any suitable shape of the stirring body 103 may also be possible. In some embodiments, the stirring body 103 may have a cone shape, a truncated cone shape, etc.

The stirring bodies 103 may be manufactured separately from the other parts of the stirring component 100 and then assembled together with suitable fastening means such as fasteners, bonding, etc. This may further facilitate the manufacturing and maintenance of the stirring component 100. In some alternative embodiments, the stirring bodies 103 may also be integrally formed with the other parts of the stirring component 100. This may facilitate the strength improvement of the stirring component 100.

Other aspect according to embodiments of the present disclosure further provides a robot using the harmonic transmission system 200 as mentioned above. With the harmonic transmission system 200 having the stirring component 100, the robot can be more reliable and have a longer service life.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A stirring component for a harmonic transmission system, comprising:
    a body arranged in an internal chamber at a side of a circular spline away from a flex spline of the harmonic transmission system, the body comprising a coupling hole through which the body is coupled to and rotated with an input shaft of the harmonic transmission system; and
    at least one stirring recess arranged on a side of the body adjacent to the circular spline and has a varying depth in an axial direction to stir and push lubricant medium within the internal chamber towards the flex spline during rotation of the body;
        wherein the depth of the at least one stirring recess gradually decreases from a middle to both ends of the stirring recess in a circumferential direction.

2. The stirring component of claim 1, wherein the at least one stirring recess comprises a plurality of stirring recesses that are equally spaced and each have a fan shape.

3. The stirring component of claim 1, wherein a bottom surface of the at least one stirring recess has a curved cross-section in the circumferential direction.

4. The stirring component of claim 1, wherein an extension angle of the at least one stirring recess in a circumferential direction is between 45°-180°.

5. The stirring component of claim 1, wherein a number of the at least one stirring recess is from 2 to 4.

6. The stirring component of claim 1, further comprising:
    a plurality of stirring bodies protruding from an end surface of the body adjacent to the circular spline into a ring groove of the circular spline.

7. The stirring component of claim 6, wherein the plurality of stirring bodies comprise at least two sets of stirring bodies having different radial distances from a center axis of the input shaft.

8. The stirring component of claim 6, wherein each of the plurality of stirring bodies is cylindrical.

9. The stirring component of claim 1, wherein the body is coupled to the input shaft by fasteners, a tight fitting, or a key fitting.

10. A harmonic transmission system, comprising:
    the stirring component of claim 1 arranged in the chamber and coupled to the input shaft at a side of the circular spline away from the flex spline;
    wherein the circular spline comprises internal teeth;
    wherein the flex spline is coupled to an output shaft and comprises external teeth adapted to be partially engaged with the internal teeth, the flex spline partially enclosing an internal chamber; and
    a wave generator adapted to be driven by an input shaft to rotate and having an oval shape to promote engagement of the internal teeth and the external teeth during rotation.

11. A robot, comprising:
    a plurality of robot arm links; and
    the harmonic transmission system of claim 10 arranged between the plurality of robot arm links.

12. The harmonic transmission system of claim 10, wherein the at least one stirring recess comprises a plurality of stirring recesses that are equally spaced and each have a fan shape.

13. The harmonic transmission system of claim 10, wherein the depth of the at least one stirring recess gradually decreases from a middle to both ends of the stirring recess in a circumferential direction.

14. The harmonic transmission system of claim 13, wherein a bottom surface of the at least one stirring recess has a curved cross-section in the circumferential direction.

15. The harmonic transmission system of claim 10, wherein an extension angle of the at least one stirring recess in a circumferential direction is between 45°-180°.

16. The harmonic transmission system of claim 10, wherein a number of the at least one stirring recess is from 2 to 4.

17. The harmonic transmission system of claim 10, wherein the stirring component further comprises:
    a plurality of stirring bodies protruding from an end surface of the body adjacent to the circular spline into a ring groove of the circular spline.

18. The harmonic transmission system of claim 17, wherein the plurality of stirring bodies comprise at least two sets of stirring bodies having different radial distances from a center axis of the input shaft.

19. The harmonic transmission system of claim 17, wherein each of the plurality of stirring bodies is cylindrical.

* * * * *